(12) United States Patent
Bradfield et al.

(10) Patent No.: US 7,320,033 B2
(45) Date of Patent: Jan. 15, 2008

(54) DYNAMIC LOCAL DRIVE AND PRINTER SHARING

(75) Inventors: Terry R. Bradfield, Beaverton, OR (US); Jeff R. Jackson, Newberg, OR (US); Christopher J. Cormack, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 706 days.

(21) Appl. No.: 09/917,320

(22) Filed: Jul. 27, 2001

(65) Prior Publication Data

US 2003/0023725 A1    Jan. 30, 2003

(51) Int. Cl.
| | |
|---|---|
| *G06F 15/16* | (2006.01) |
| *G06F 7/04* | (2006.01) |
| *G06F 12/14* | (2006.01) |
| *H04L 9/32* | (2006.01) |
| *G06F 15/173* | (2006.01) |
| *G06F 17/30* | (2006.01) |
| *G06K 9/00* | (2006.01) |

(52) U.S. Cl. ............... 709/225; 709/216; 709/218; 709/226; 709/228; 709/229; 709/249; 709/250; 726/4; 726/17; 726/21; 726/27; 726/30

(58) Field of Classification Search ............ 709/203, 709/219, 223–226, 229, 204, 212, 215, 216, 709/218, 228, 248–250; 713/200–202; 726/2–4, 16, 17, 21, 27–30

See application file for complete search history.

(56) References Cited

U.S. PATENT DOCUMENTS

| | | | | |
|---|---|---|---|---|
| 5,550,981 A | * | 8/1996 | Bauer et al. ............. | 709/220 |
| 5,647,056 A | * | 7/1997 | Barrett et al. ............ | 709/220 |
| 5,768,516 A | * | 6/1998 | Sugishima ................ | 709/217 |
| 5,805,924 A | * | 9/1998 | Stoevhase ................ | 710/11 |
| 5,812,819 A | * | 9/1998 | Rodwin et al. ............ | 703/23 |
| 5,819,047 A | * | 10/1998 | Bauer et al. ............. | 709/229 |
| 5,901,284 A | * | 5/1999 | Hamdy-Swink ........... | 713/200 |
| 5,940,591 A | * | 8/1999 | Boyle et al. .............. | 726/3 |
| 5,941,956 A | * | 8/1999 | Shirakihara et al. ....... | 709/245 |
| 6,138,162 A | * | 10/2000 | Pistriotto et al. .......... | 709/229 |
| 6,151,629 A | * | 11/2000 | Trewitt ................... | 709/227 |
| 6,209,048 B1 | * | 3/2001 | Wolff ..................... | 710/62 |

(Continued)

FOREIGN PATENT DOCUMENTS

KR    2001002930 A    *    1/2001

OTHER PUBLICATIONS

Famolari, David. "Link Performance of an Embedded Bluetooth Personal Area Network," IEEE Intl Conference on Communications, vol. 8, Jun. 14, 2001, pp. 2573-2577.*

(Continued)

*Primary Examiner*—Melvin H. Pollack
(74) *Attorney, Agent, or Firm*—Kacvinsky LLC

(57) ABSTRACT

A system and process are described where a user of a mobile device grants access to resources associated with the mobile device to other users. Access is typically established when the user of the mobile device couples the device to a network environment and another user provides data that matches sharing criteria associated with the desired resource. The sharing criteria can include user ID/password combination, a network ID or a combination of both.

17 Claims, 7 Drawing Sheets

U.S. PATENT DOCUMENTS

| | | | | |
|---|---|---|---|---|
| 6,209,104 | B1* | 3/2001 | Jalili | 713/202 |
| 6,233,543 | B1* | 5/2001 | Butts et al. | 703/27 |
| 6,233,618 | B1* | 5/2001 | Shannon | 709/229 |
| 6,317,797 | B2* | 11/2001 | Clark et al. | 710/5 |
| 6,351,772 | B1* | 2/2002 | Murphy et al. | 709/227 |
| 6,370,582 | B1* | 4/2002 | Lim et al. | 709/230 |
| 6,393,569 | B1* | 5/2002 | Orenshteyn | 726/4 |
| 6,411,943 | B1* | 6/2002 | Crawford | 705/400 |
| 6,418,484 | B1* | 7/2002 | Radia | 719/316 |
| 6,442,696 | B1* | 8/2002 | Wray et al. | 713/201 |
| 6,466,804 | B1* | 10/2002 | Pecen et al. | 455/558 |
| 6,484,174 | B1* | 11/2002 | Wall et al. | 707/9 |
| 6,490,154 | B2* | 12/2002 | Thompson | 361/686 |
| 6,493,825 | B1* | 12/2002 | Blumenau et al. | 713/168 |
| 6,519,144 | B1* | 2/2003 | Henrie et al. | 361/686 |
| 6,542,734 | B1* | 4/2003 | Abrol et al. | 455/412.1 |
| 6,546,425 | B1* | 4/2003 | Hanson et al. | 709/227 |
| 6,580,906 | B2* | 6/2003 | Bilgic et al. | 455/422.1 |
| 6,601,040 | B1* | 7/2003 | Kolls | 705/14 |
| 6,601,101 | B1* | 7/2003 | Lee et al. | 709/227 |
| 6,615,264 | B1* | 9/2003 | Stoltz et al. | 709/227 |
| 6,629,123 | B1* | 9/2003 | Hunt | 718/106 |
| 6,633,759 | B1* | 10/2003 | Kobayashi | 455/419 |
| 6,633,905 | B1* | 10/2003 | Anderson et al. | 709/219 |
| 6,697,806 | B1* | 2/2004 | Cook | 707/10 |
| 6,700,955 | B1* | 3/2004 | Davis et al. | 379/90.01 |
| 6,711,263 | B1* | 3/2004 | Nordenstam et al. | 380/282 |
| 6,725,238 | B1* | 4/2004 | Auvenshine | 707/200 |
| 6,725,303 | B1* | 4/2004 | Hoguta et al. | 710/106 |
| 6,728,885 | B1* | 4/2004 | Taylor et al. | 726/24 |
| 6,745,047 | B1* | 6/2004 | Karstens et al. | 455/556.1 |
| 6,747,961 | B1* | 6/2004 | Ahmed et al. | 370/328 |
| 6,754,321 | B1* | 6/2004 | Innes et al. | 379/201.03 |
| 6,754,826 | B1* | 6/2004 | Challener et al. | 713/182 |
| 6,757,530 | B2* | 6/2004 | Rouse et al. | 455/412.1 |
| 6,760,748 | B1* | 7/2004 | Hakim | 709/204 |
| 6,772,331 | B1* | 8/2004 | Hind et al. | 713/151 |
| 6,816,925 | B2* | 11/2004 | Watts, Jr. | 710/36 |
| 6,857,068 | B1* | 2/2005 | Moller et al. | 713/2 |
| 6,862,267 | B1* | 3/2005 | Hughes et al. | 370/252 |
| 6,871,063 | B1* | 3/2005 | Schiffer | 455/410 |
| 6,917,963 | B1* | 7/2005 | Hipp et al. | 709/204 |
| 6,917,987 | B2* | 7/2005 | Parthasarathy et al. | 709/249 |
| 6,947,398 | B1* | 9/2005 | Ahmed et al. | 370/331 |
| 6,981,155 | B1* | 12/2005 | Lyle et al. | 726/22 |
| 7,032,243 | B2* | 4/2006 | Leerssen et al. | 726/17 |
| 7,039,724 | B1* | 5/2006 | Lavian et al. | 709/250 |
| 7,073,055 | B1* | 7/2006 | Freed et al. | 713/155 |
| 7,117,526 | B1* | 10/2006 | Short | 726/5 |
| 7,130,880 | B1* | 10/2006 | Burton et al. | 709/203 |
| 2002/0032780 | A1* | 3/2002 | Moore et al. | 709/228 |
| 2002/0124100 | A1* | 9/2002 | Adams | 709/232 |
| 2002/0184385 | A1* | 12/2002 | Kato | 709/237 |
| 2003/0008680 | A1* | 1/2003 | Huh et al. | 455/557 |
| 2003/0023725 | A1* | 1/2003 | Bradfield et al. | 709/225 |
| 2003/0033522 | A1* | 2/2003 | Bilgic et al. | 713/168 |
| 2003/0055912 | A1* | 3/2003 | Martin et al. | 709/218 |

OTHER PUBLICATIONS

Luciani, J. et al. "NHRP with Mobile NHCs," RFC 2520, Feb. 1999, pp. 1-8.*

Corson, S. and Macker, J. "Mobile Ad hoc Networking (MANET): Routing Protocol Performance Issues and Evaluation Considerations," RFC 2501, Jan. 1999, pp. 1-12.*

Calhoun, P. and Perkins, C. "Mobile IP Network Access Identifier Extension for IPv4," RFC 2794, Mar. 2000, pp. 1-9.*

Glass, S. et al. "Mobile IP Authentication, Authorization, and Accounting Requirements," RFC 2977, Oct. 2000, pp. 1-27.*

Perkins, C. and Calhoun, P. "Mobile IPv4 Challenge/Response Extensions," RFC 3012, Nov. 2000, pp. 1-17.*

Walden, D. C. "A System for Interprocess Communication in a Resource Sharing Computer Network," RFC 62, Aug. 1970, pp. 1-20.*

Day, John et al. "An RJE Protocol for a Resource Sharing Network," RFC 725, Mar. 1977, pp. 1-26.*

* cited by examiner

```
F:
├── Client ABC
│   ├── Project 1
│   │   ├── Proposal.doc
│   │   ├── Report_1.doc
│   │   ├── Billing.doc
│   │   ├── Contact_List.xls
│   │   └── Crypto.exe
│   └── Project 2
├── Client XYZ
└── Samples
```

200

300

| Name | User ID | Password | Network Name | Network ID |
|---|---|---|---|---|
| Samples Project 2 | new_empl ABC_empl | 123456 access | Main Office | LMNOP123 |
| Printer 1 | | | Main Office, Client_ABC-NY | ZYXW8765 QRST0246 |

310  315a  315b  320a  320b

DYNAMIC LOCAL DRIVE AND PRINTER SHARING

TECHNICAL FIELD

This invention relates to network systems, and more particularly to sharing resources between users in a network system.

BACKGROUND

As technology improves, users demand smaller devices that are mobile, have more memory, and can execute more complex functions. As one example, notebook computers are much smaller than their desktop counterparts, but have a comparable memory and execute the same applications.

As another example, mobile telephones use modern communications techniques to allow the user to make and receive calls from just about anywhere. Most mobile phones include a database of names and numbers to make dialing easier.

Personal digital assistants (PDAs) are an extension of notebook computers, are typically small enough to fit in someone's hand, and operate via a small touch screen. PDAs also have databases (such as an address book and a compilation of email messages) to assist the operator in performing operations.

These devices have at least two features in common. First, they all have databases and applications (executable programs). Second, they all are portable. This portability allows any of these devices to be used in many environments. Examples of environments include the user's home, the user's office, and the home or office of another person.

Since these types of devices can be linked to multiple environments, a problem may arise in the unwanted sharing of data or applications. As an example, suppose a user uses his notebook computer for home accounting purposes while at home and for the generation of work product (e.g., proposals or budgets) while at work. When the notebook computer is in the work environment, other people may be able to obtain access to the user's home accounting data. Similarly, work product may become available to the user's family members when the notebook computer is used at home.

Currently, some operating systems, such as Windows® 95, 98, 2000 and NT from Microsoft, allow a user to grant access to a directory, file or application on an individual or group basis. In the Windows® operating systems, the user uses the Control Panel to grant other users read only, write only or read/write access. The access that the third party users receive is assigned to each directory, file or application. It is up to the user to get the network user names of everyone who will receive access to every directory, folder or file.

DESCRIPTION OF DRAWINGS

Like reference symbols in the various drawings indicate like elements.

DETAILED DESCRIPTION

As described above, resources, hardware and software that perform functions such as printing or word processing, may be associated with one machine but shared by a plurality of users via a network. By associating these shared resources with particular network environments, unauthorized access to these shared resources by some users can be eliminated. This can be accomplished by requiring that a user desiring access to a shared resource use a particular network environment to access the shared resource.

Figure 1:
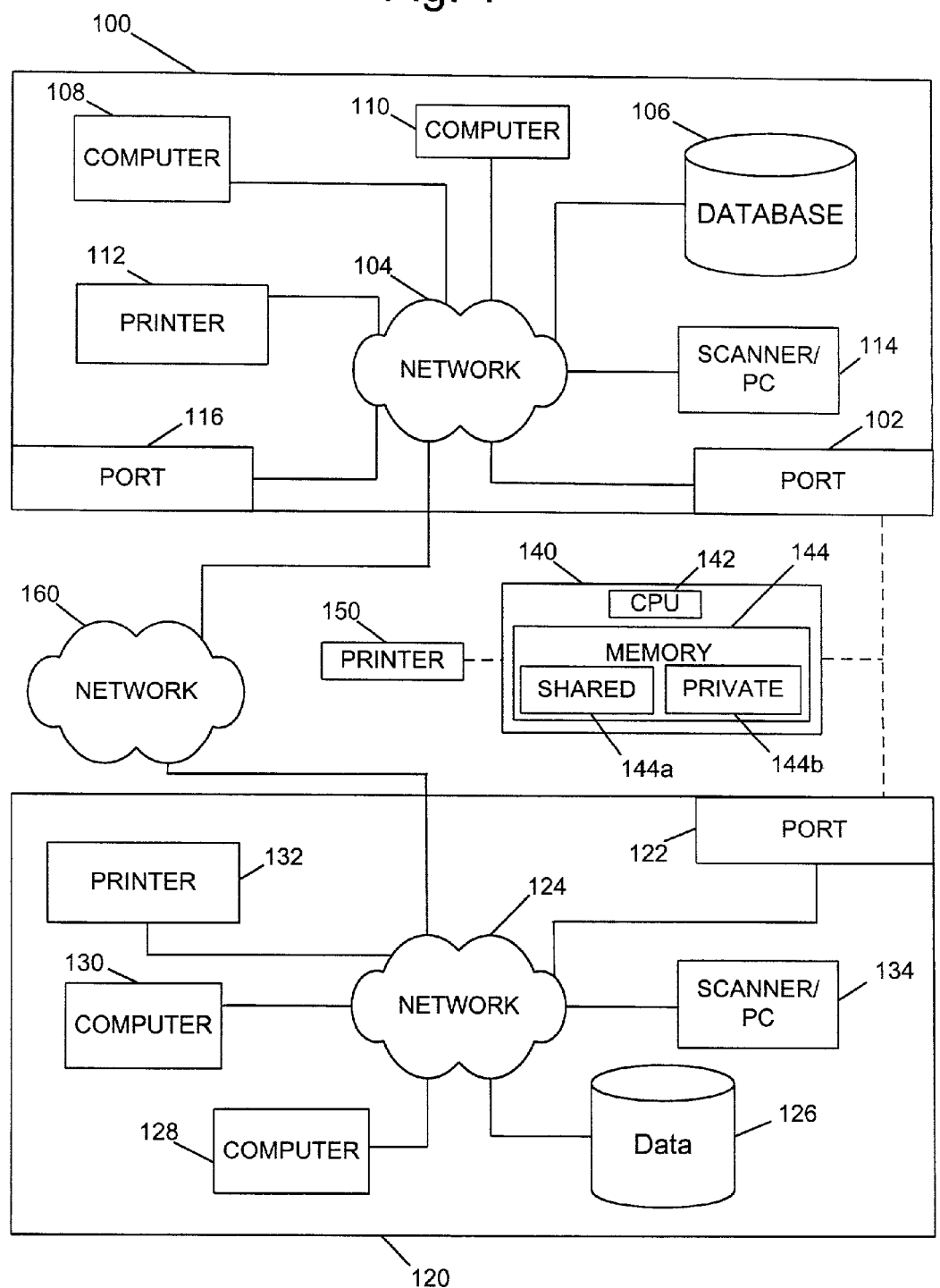
FIG. 1 is a block diagram of a computer system.

Referring to FIG. 1, a network environment 100 includes a port 102 that allows a device to be coupled into the network environment 100. One example of such a port is a docking station that allows a notebook computer to be coupled to the network environment 100. Port 102 is itself coupled to network 104. Network 104 includes the connectors, typically copper wires or fiber optic lines, and any routers/switches needed to move data and signals between port 102 and the various components described below.

Network environment 100 also includes a database 106 that stores data and executable files. The data and files stored within database 106 are accessible to users via network 104. Computers 108 and 110 also are coupled to network 104. A typical computer locally stores data and applications on a hard drive, or equivalent storage device, and can execute applications that require transmitting data requests to, and receiving data from database 106 or another computer via network 104.

Printer 112 also is coupled to network 104. Printer 112 receives data from other components via network 104. Typically, printer 112 prints a document in response to control signals and data received from another component, such as computer 108, via network 104. Scanner/PC combination 114 is also coupled to network 104 and allows images and text to be scanned and transmitted to any other component in the environment.

A mobile device 140 can be coupled to port 102 to work with the other components in network environment 100. Mobile device 140 includes a central processing unit (CPU) 142 and memory 144. Stored in memory 144 are shared files 144a and private files 144b. Generally, once coupled to a port, certain individuals may obtain access to the shared files 144a while no one except the user of mobile device 140 may obtain access to private files 144b. As it pertains to folders, file directories and applications, access means a user may open a particular folder, file directory or application and use it to perform a function or locate another folder, file, directory or application.

Printer 150 can be coupled to mobile device 140. Generally speaking, printer 150 is a local printer that is predominantly used by mobile device 140 but can receive print jobs from other devices as will be described in more detail below. Thus, other users may obtain access to printer 150. By obtaining access to a piece of hardware, such as a printer, the user may use that piece of hardware for his or her own purpose.

Network environment 120 is similar to network environment 100. Network environment 120 includes port 122, network 124, database 126, computers 128 and 130, printer 132 and scanner/PC combination 134. Coupling network environment 100 to network environment 120 is accomplished via network 160. Network 160 may be a wide area network ("WAN") coupled to internal environmental networks 104 and 124. For example, network 160 may be the Internet.

It should be noted that the techniques described below are applicable regardless of the number of components or relative size (e.g., LAN vs. WAN) of the environments. Thus, the techniques can be implemented in an environment that contains more printers and more computers than the exemplary network environments shown in FIG. 1. In addition, the techniques may be implemented between more than two environments.

Since mobile device 140 is portable, it is used in both network environment 100 and network environment 120. To interact with environment 100, the user simply couples mobile device 140 to port 102 to gain access to many of the attributes of network environment 100 via network 104. Other users of network environment 100 also may gain access to some of the shared files 144a stored in memory 144 depending on the sharing criteria established by the user of the mobile device 140.

Similarly, to gain access to the many attributes of network environment 120, the user of mobile device 140 couples mobile device 140 to port 122. Once coupled to port 122, other users of network environment 120 may gain access to some of the shared files 144a stored in memory 144 depending on the sharing criteria established by the user of mobile device 140.

Nobody other than the user of mobile device 140 can obtain access to private files 144b regardless of whether or not mobile device 140 is coupled to one of network environments 100 or 120.

The user of mobile device 140 may obtain access to data in either database 106 or database 126 depending on the network to which mobile unit 140 is coupled. Thus, the user of mobile device 140 may read, edit and create files in database 106 or database 126 if mobile device 140 is coupled to either port 102 or 122.

Figures 2, 3:
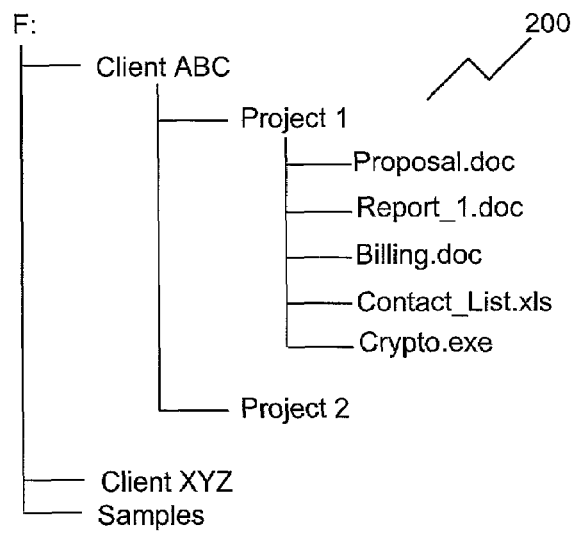
FIG. 2 is a graphical representation of a hierarchy of folders, files and applications.
FIG. 3 is a data table of sharing criteria used to grant users access to parts of the hierarchy in FIG. 2.

The hierarchy 200 shown in FIG. 2 organizes folders, files and applications. A directory or folder is a grouping of any combination of the following: sub-folders, files or applications. Some folders are parent folders, which means that they contain sub-folders. For the example shown in FIG. 2, the root directory is called "F:." It has three sub-directories or sub-folders "Client ABC", "Client XYZ" and "Samples". Sub-folder "Client ABC" contains the "Project 1" sub-folder and the "Project 2" sub-folder.

The exemplary hierarchy shown in FIG. 2 is one that a professional consultant may establish. The particular user of mobile device 140 provides services and work product to client ABC and client XYZ. Since these are separate clients, it is clear that some folders, files or applications are not to be shared with some individuals. In other words, while the user of mobile device 140 may want to grant access to information contained in the "Client ABC" folder with ABC employees, the user would not want the information in the "Client ABC" folder to be accessible to employees of client XYZ.

Referring to FIG. 3, a data table 300 includes a column 310 that contains resource identifiers that are used to distinguish between the resources that are available for sharing on mobile device 140. Resource identifiers are names used to distinguish one resource from the others. Column 315a contains user IDs that correspond to individuals or groups of individuals who may access the associated resource listed in the corresponding row of column 310. Column 315b contains passwords associated with the user IDs listed in column 315a. When an individual with a listed user ID in 315a also enters the corresponding password in column 315b, he/she obtains access to the resource listed in column 310.

Column 320a contains network names that are network names identifiers entered by the user of the mobile device 140 to designate various network environments. In other words, network names are words used by the user of mobile device 140 to distinguish one network environment from another. Column 320b contains unique network identifiers or ID numbers, each of which is associated with one network connection (i.e., one port into a network environment). Network identifiers are machine level strings of characters or data that distinguish one network environment access point from other network environment access points. In one exemplary implementation, the network connection is made through a port containing an Ethernet card, and the corresponding unique number is the media access control (MAC) address of that Ethernet card. It should be noted that multiple network IDs can be associated with a single environment. For example, referring again to FIG. 1, network environment 100 is accessible through two ports containing two different network IDs, with one network identifier being provided by port 102 and the other being provided by port 116.

The association between the network name in column 320a and the network identifier in column 320b allows for easier use. When mobile device 140 is coupled to a network environment for the first time, the user is prompted to associate an easily recallable network name with the network identifier obtained from the network environment hardware and/or software. As will be described later, the user can use the network name to establish sharing criteria to allow certain individuals access to resources associated with mobile device 140.

Columns 315a, 315b and 320b provide examples of sharing criteria. The data in column 320a is used as display data to inform the user of mobile device 140 which networks are available for use in establishing sharing criteria. Columns 315a, 315b and 320a provide three possible ways for an individual to gain access to a shared resource. In one implementation, access occurs only through the use of a user ID/password combination. In this implementation, network identifiers are not used to determine who may access or not access a resource. In other words, if a selected file is designated as shared through a user ID/password combination, then it cannot be accessed through the use of a network ID.

In a second implementation, access to shared resources is determined solely by association with a network identifier. In this implementation, when mobile device 140 is coupled to a particular network through a particular port, everyone else who has access to that network may access the resources associated with the network identifier of that network. Similarly, if a file can be accessed only through a network identifier, then it cannot be accessed through a user ID/password combination.

In a third implementation, access to shared resources is based on a combination of sharing criteria. In other words, not only does the corresponding network identifier need to be used, but also the correct user ID/password combination needs to be entered in order for a user to be able to access the resource.

By storing data into data table 300, associations between resources and sharing criteria are established. An association is a linking of the resource to sharing criteria.

The types of sharing criteria described above control and limit network user access to folders, files, applications and hardware devices. In other words, these sharing criteria establish an access requirement. The network user or the network itself must provide data that matches the sharing criteria so as to pass the access requirement and thereby grant the user access to the file, folder, application or hardware device.

Figure 4:
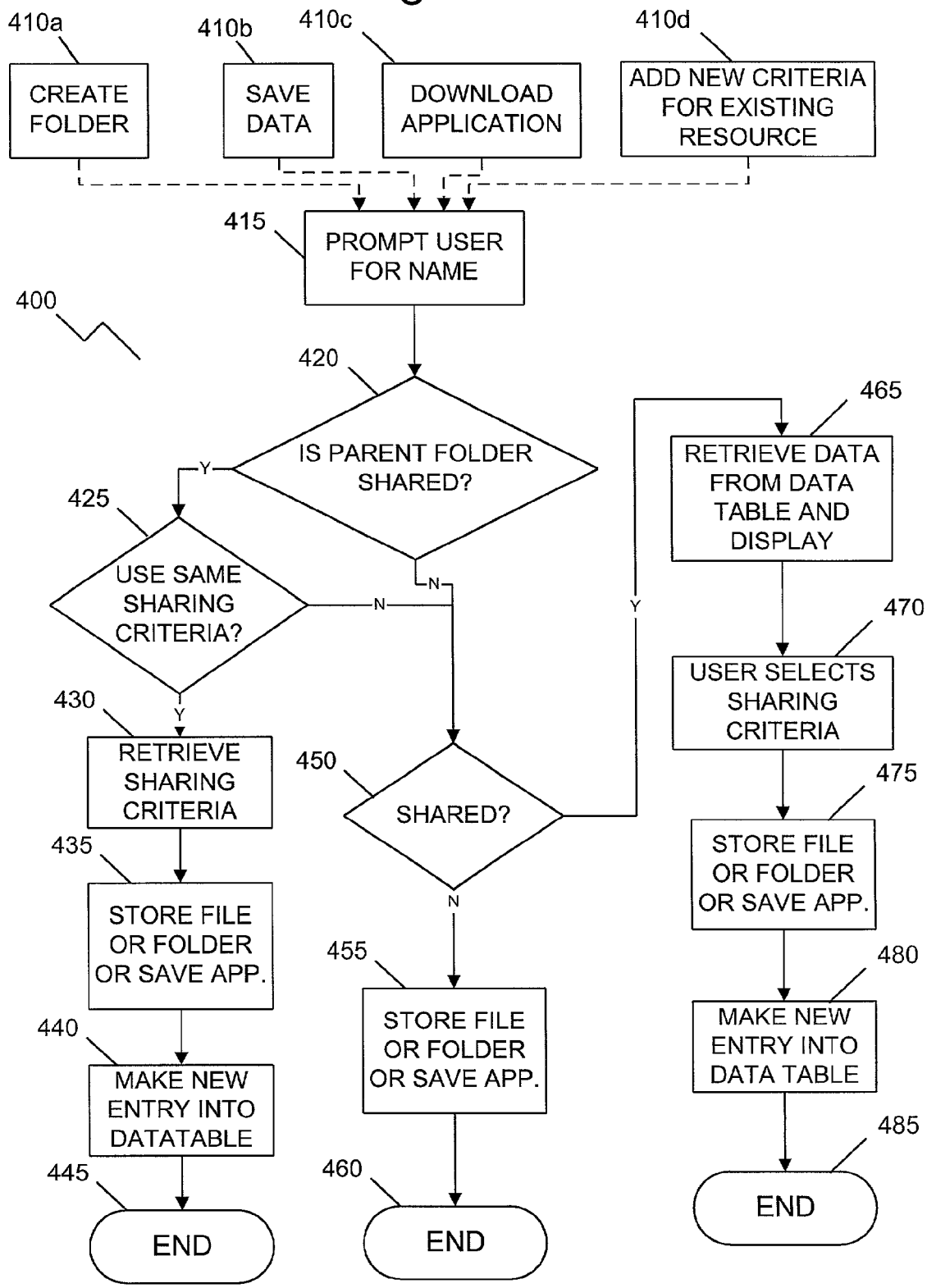
FIG. 4 is a flow chart of a process for establishing some of the sharing criteria shown in FIG. 3.

Referring to FIG. 4, the user of mobile device 140 saves data or information into memory 144 according to a procedure 400. As one example, the user can initiate this process when he/she creates a new folder (step 410*a*). More particularly, a new folder or directory is created when the user clicks on the "New Folder" option from the "File" menu when using any of the Windows® 95, 98, 2000 or NT operating systems. Alternatively, the user could simply save working data, such as a spreadsheet or word processing document (step 410*b*), download a new application (step 410*c*) or select the option to establish new sharing criteria to a pre-existing folder, file or application (step 410*d*) to initiate procedure 400.

Mobile device 140 responds to the user's request to store data by providing the user with a prompt to enter the name of the folder, file or application (step 415). The mobile device also may permit the user to designate a directory in which the new item is to be placed.

Mobile device 140 then determines if the parent folder of the new folder, file or application is already shared (step 420). If the answer is "Yes," then mobile device 140 prompts the user on whether the sharing criteria (e.g., user name/password combination and/or network identifier) for the parent folder are to be used to grant or deny access to this new folder, file or application (step 425). If the user replies "Yes", the sharing criteria for the parent folder are retrieved (step 430). The folder, file or application then is stored in the appropriate directory or folder (step 435). The retrieved sharing criteria is then used to make a new entry, along with the name entered earlier (see step 415) for the new folder, file or application, in table 300 of FIG. 3 (step 440). The process then ends (step 445).

If the new folder, file or application is not placed into a parent folder that is currently shared (see step 420), or if the sharing criteria for the new folder, file or application is not to be copied from the parent folder (see step 425) but is instead to be created anew, then mobile device 140 prompts the user on whether or not he/she wants the new folder, file or application to be shared (step 450). If the user does not want the new folder, file or application to be shared, the process continues so that the folder, file or application is stored (step 455). The folder, file or application is thus stored in private memory 144*b*, which means that only the user of mobile device 140 has access to it. Regardless of where mobile device 140 is used, or what network environment it is coupled to, private memory 144*b* is only accessible to the user of mobile device 140. A user of another device, such as computer 128 of FIG. 1, cannot gain access to the privately stored folder, file or application, even when mobile device 140 is coupled to port 122. After storing the folder, file or application, the process ends (step 460).

Figure 5:
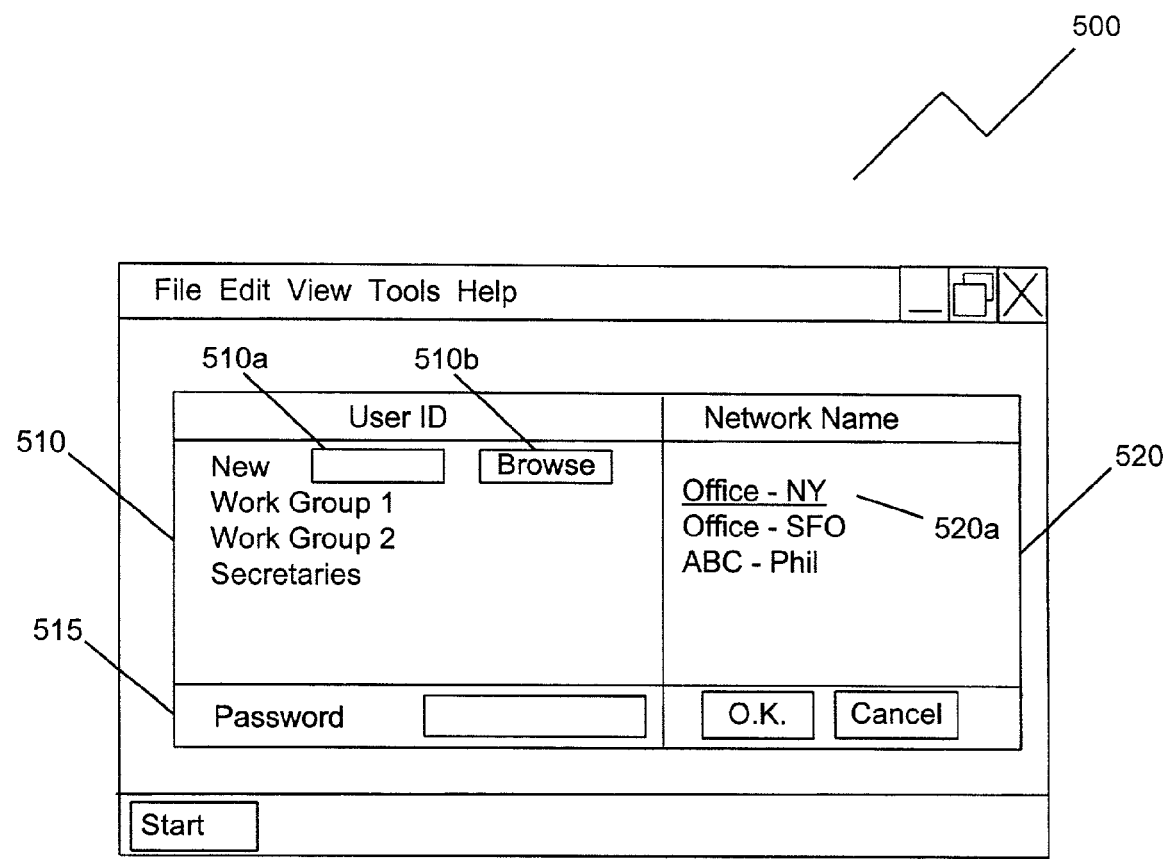
FIG. 5 is a graphic user interface for entering the sharing criteria into the data table of FIG. 3.

If the user decides to share the new folder, file or application (see step 450), then it follows from the decisions made previously (steps 420 and 425) that the user wants to create new sharing criteria for the new folder, file or application. This is accomplished by having mobile device 140 search its registry for data table 300 (step 465). As described earlier, this data table contains a list of all user IDs and network identifiers associated with other shared resources such as folders, files and applications in memory 144 of mobile device 140. Mobile device 140 retrieves this data from data table 300 and displays the user IDs from column 315*a* and the network short names associated with network IDs in column 320*a* to the user (step 465). An exemplary screen shot 500 of this retrieved data is shown in FIG. 5. It should be noted that other screens for obtaining user input for creating new sharing criteria are possible. For example, a simpler screen would prompt the user on whether or not he or she wishes to default and thereby establish sharing criteria solely based upon the network identifier associated with the network to which mobile device 140 is currently coupled.

In FIG. 5, user IDs stored in data table 300 are displayed in section 510. The "New" name in section 510 has dialog box 510*a* for allowing the user to enter a new user name and the "Browse" button allows the user to retrieve a user ID from a database in the network environment. By allowing the user to browse the network environment to which mobile device 140 is currently coupled, the user is able to locate and add new user IDs to data table 300.

In section 515, the user enters a new password to go along with a selected user ID or recently created user ID from section 510. The network names (i.e., column 320*a* of data table 300) are displayed in section 520. Network names are identifiers that a user enters to aid him/her in selecting sharing criteria. In one implementation, the network environment to which the mobile device 140 is currently coupled, 520*a*, is underlined or highlighted to remind the user which network he/she is currently using.

Returning to FIG. 4, the user selects the desired sharing criteria (step 470). More specifically, the user selects whether to grant access through one or more user ID/password pairs only, access through one or more network identifies only, or through a combination of both. Referring again to FIG. 5, this selection of sharing criteria by the user is accomplished by the user clicking on zero, one or more items from each section 510 and 520. Once the user clicks on a user ID or a network name, that item is highlighted in FIG. 5. The user can un-select a particular sharing criterion by clicking again on the highlighted user ID or network name. After the user has selected the desired sharing criteria, and entered a password in section 515 (if necessary), the folder, file or application is stored (step 475).

Mobile device 140 then creates a new entry in data table 300 that associates the new folder, file or application with the sharing criteria earlier selected/entered by the user (step 480). The process then ends (step 485).

Figure 6:
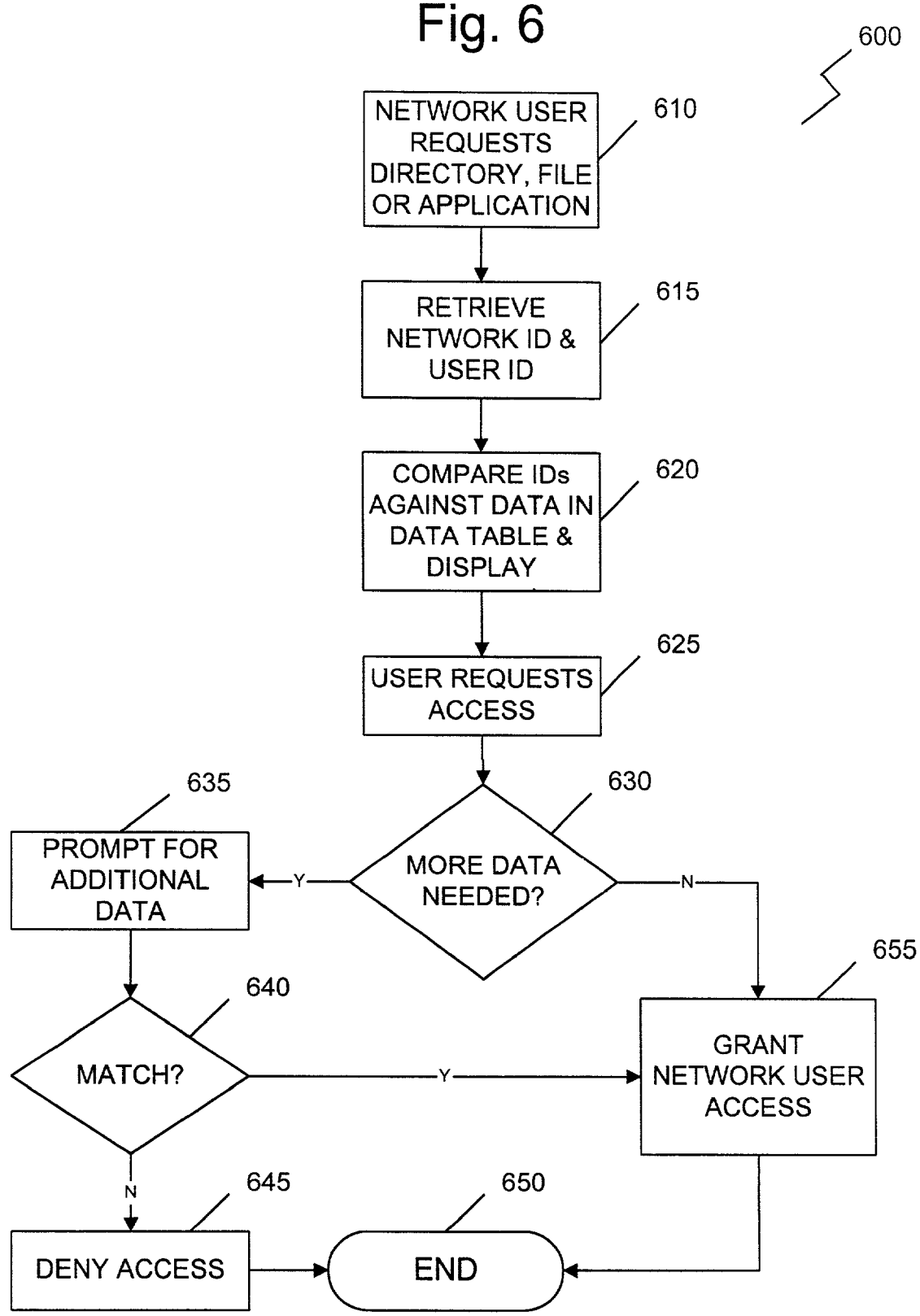
FIG. 6 is a flow chart of a process for obtaining and preventing access to parts of the hierarchy in FIG. 2.

Referring to FIG. 6, a network user (i.e., someone using computers 108, 110, 128, and 130 in FIG. 1) requests access to a directory, file or application stored in memory 144 of mobile device 140 according to procedure 600. The process begins by the network user requesting access to a directory, file or application (step 610). It should be noted that prior to this, mobile device 140 was coupled to an environment through a port (not shown in procedure 600). Requesting access to a folder, file or application is typically accomplished in a Windows® 95, 98, 2000 or NT environment by clicking on the "My Computer" icon. The response to such a request is to display to the network user a listing of all directories accessible to the network user. The network user then drills down through the directories until he/she finds the folder(s), file(s) or application(s) for which he/she is looking.

Mobile device 140 then reads the network identifier associated with the port to which it is coupled and obtains the user ID of the person requesting access to a folder, file or application (step 615). In one implementation, the network identifier is the MAC address of an Ethernet card and the user ID is the login ID that the network user uses to gain access to the network environment.

Mobile device 140 next compares the received network ID and the received user ID with data in data table 300 (step 620). In doing so, mobile device 140 makes three sub-comparisons. The first is to determine if access to a shared resource is determined solely based upon the received user ID (i.e., the network connection is irrelevant). The second is to determine which resources are accessible to the network, and therefore the network user, based upon the received network identifier. The final comparison is to determine which resources require both the user ID and the network identifier for granting access.

After mobile device 140 determines which of the required sharing criteria the network user meets, in other words which resources the network user has access to, the mobile device forwards a list of accessible folders, files and applications to the network user's device for display (step 620). It follows that the folders, files and applications for which the network user fails to provide matching sharing criteria are not displayed. The network user then requests access to one of the displayed folders, files or applications (step 625).

Mobile device 140 next determines if any additional data is needed before sharing the selected folder, file or application with the network user (e.g., does the network user need to provide a password for access to satisfy the user vat ID/password combination) (step 630). If any additional data is needed, the network user is prompted for the additional data by mobile device 140 through the network (step 635). Mobile device 140 then compares the received data from the network user against stored data to determine if there is a match. In one example, the network user enters a password and this password is compared with the password stored in column 315*b* of data table 300 associated with the folder, file or application selected (step 640).

If the received additional data does not match the stored data, mobile device 140 sends a message to the network user via the network informing him/her that access to the requested folder, file or application is denied (step 645). The process then ends (step 650).

If the received additional data matches the stored data, mobile device 140 grants access to that folder, file or application (step 655). The process then ends (step 650).

If additional data is not needed (e.g., the sharing criteria consisted solely of network ID) (see step 630) then the network user is granted access to the requested folder, file or application (step 655). The process then ends (step 650).

How the sharing criteria are used to grant access to certain folders, files and applications may be illustrated with the following example. Referring again to FIGS. 2 and 3, the root directory is designated with the letter "F:." This is the highest level in memory 144. Below root directory "F:" are three sub-directories "Client ABC," "Client XYZ" and "Samples." Below "Client ABC" are "Project 1" and "Project 2." Below "Project 1" are "Proposal.doc," "Report_1.doc," "Billing.doc," "Contact_List.xls" and "Crypto_2.exe." For this example, mobile device 140 is assumed to be a notebook computer.

The user of mobile device 140 splits his/her time servicing both client companies ABC and XYZ. In order to service both client companies, the user travels to both client sites and couples mobile device 140 into their respective network environments. In this example, it would be advantageous to limit what network users may access depending upon the network to which mobile device 140 is coupled. More specifically, when using mobile device 140 at a site owned by ABC, employees of ABC are denied access to directory "Client XYZ." Similarly, when working at a site owned by client XYZ, employees of XYZ are denied access to directory "Client ABC." This is accomplished by establishing the sharing criteria for each directory "Client ABC" and "Client XYZ" to be based solely on the network identifier. Thus, access to directory "Client ABC" by XYZ employees and other unauthorized entities is prevented by requiring those who request access to be associated with the network environment maintained by ABC.

When working at ABC's site, assume that the user of mobile device 140 brings along a co-worker. This co-worker is working on Project 1 but is prohibited from working on Project 2 for ethical reasons. In this example, the co-worker could gain access to the directory "Project 2" by virtue of his/her use of a computer owned by ABC that is on the network to which mobile device 140 is coupled if the sharing criteria require only network ID data. To prevent this access, the co-worker is denied access to "Project 2" by a user ID/password combination that is in addition to the network ID access control. Since the co-worker is not given a user ID or password that will grant him/her access to "Project 2," it follows that the co-worker cannot gain access to this directory regardless of which network he/she uses. Conversely, another individual could only gain access to directory "Project 2" by both 1) using the network associated with ABC and 2) entering the user ID/password combination associated with "Project 2."

Access to the "Samples" directory is limited to co-workers of the user of mobile device 140. The "Samples" directory contains exemplary documents for new employees to train themselves. Thus, access is given to co-workers of the user of mobile device 140 based solely upon a user ID/password combination and irrespective of the network connection of mobile device 140.

It should be noted that procedure 600 is iterative in that the process repeats as the network user continues to drill down through a folder or directory. In other words, once a network user obtains access to a folder or directory, he/she is taken through procedure 600 again for each folder, file, or application in that parent folder or directory with which sharing criteria are associated. Alternatively, the mobile device user may only apply sharing criteria to a higher level folder in the hierarchy, and may leave the lower level folders, files and applications without sharing criteria. Thus, once a network user has gained access to the higher level folder through providing the correct sharing criteria, everything contained inside that folder is automatically available to the network user and he/she does not need to go through procedure 600 again for individual items contained in that access-controlled folder. In other words, by establishing sharing criteria for a higher level folder only, a network user need only go through process 600 for the higher level folder once and still obtain access to lower level folders, files and applications.

Similarly to folders, files and applications, hardware also may be shared. One piece of hardware that may be shared is a printer. Referring again to FIG. 1, since printer 150 is coupled to mobile device 140, it follows that other users of either network 110 or 120 could print to printer 150 when mobile device 140 and printer 150 are coupled to that network environment.

Referring to FIG. 3, printer 150 is listed as "Printer 1" in column 310. This means that printer 150 is available to network users if certain sharing criteria are met. It should also be noted that this resource, Printer 1, is available to network users in two separate networks, the Main Office and the Client ABC office in New York. Thus, the mobile device user can establish sharing criteria such that more than one network ID, or user ID for that matter, is acceptable for obtaining access to a folder, file, application or piece of hardware.

Figure 7:
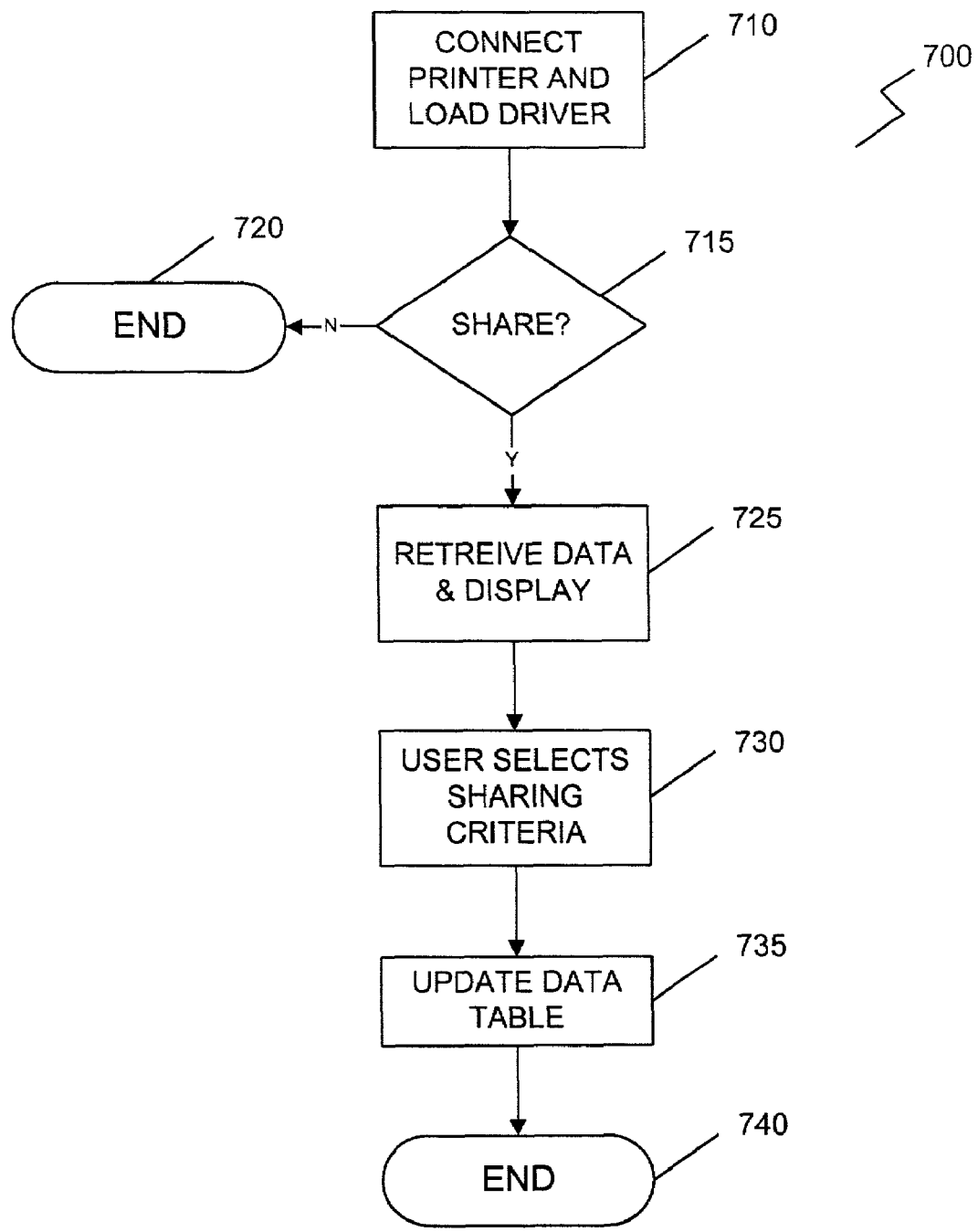
FIG. 7 is a flow chart of another process for establishing some of the sharing criteria shown in FIG. 3.

Referring to FIG. 7, the user of mobile device 140 establishes sharing criteria for a piece of hardware according to procedure 700. The process begins when the mobile device user couples printer 150, or other hardware, to mobile device 140 (step 710). If this is the first time that printer 150 has been coupled to mobile device 140, the user then installs the necessary printer drivers as well (step 710). The user then is prompted as to whether he/she wants printer 150 to be shared by others in a network (step 715). If the user does not want printer 150 to be shared, the process ends (step 720).

If the user does want printer 150 to be shared with others, the process continues by reading one or more databases in the registry (if the operating system is Windows®) (step 725). In one example, data table 300 is read. From the data read from the database(s), mobile device 140 displays to the user the list of user IDs and network names available for establishing sharing criteria to associate with printer 150. In one implementation, the user ID and network names are displayed to the user through a screen like the screen 500 shown in FIG. 5.

The user of mobile device 140 then selects the sharing criteria such as user IDs and network IDs using the displayed network short names (step 730). It should be noted that if the user selects to control user ID access to printer 150, he/she also will enter a password for the individual(s) associated with that user ID (step 730). Next, the one or more databases are updated with the sharing criteria (step 735), and the process then ends (step 740).

When a network user prints, the print job can be sent to printer 150 if the network user meets the requisite sharing criteria. The process of printing on printer 150 is the same as that shown in FIG. 6 with the exception that printers are listed in step 620 instead of folders, files or applications. In the interest of brevity, the description of printing to printer 150 will not be described with respect to FIG. 6.

Figure 8:
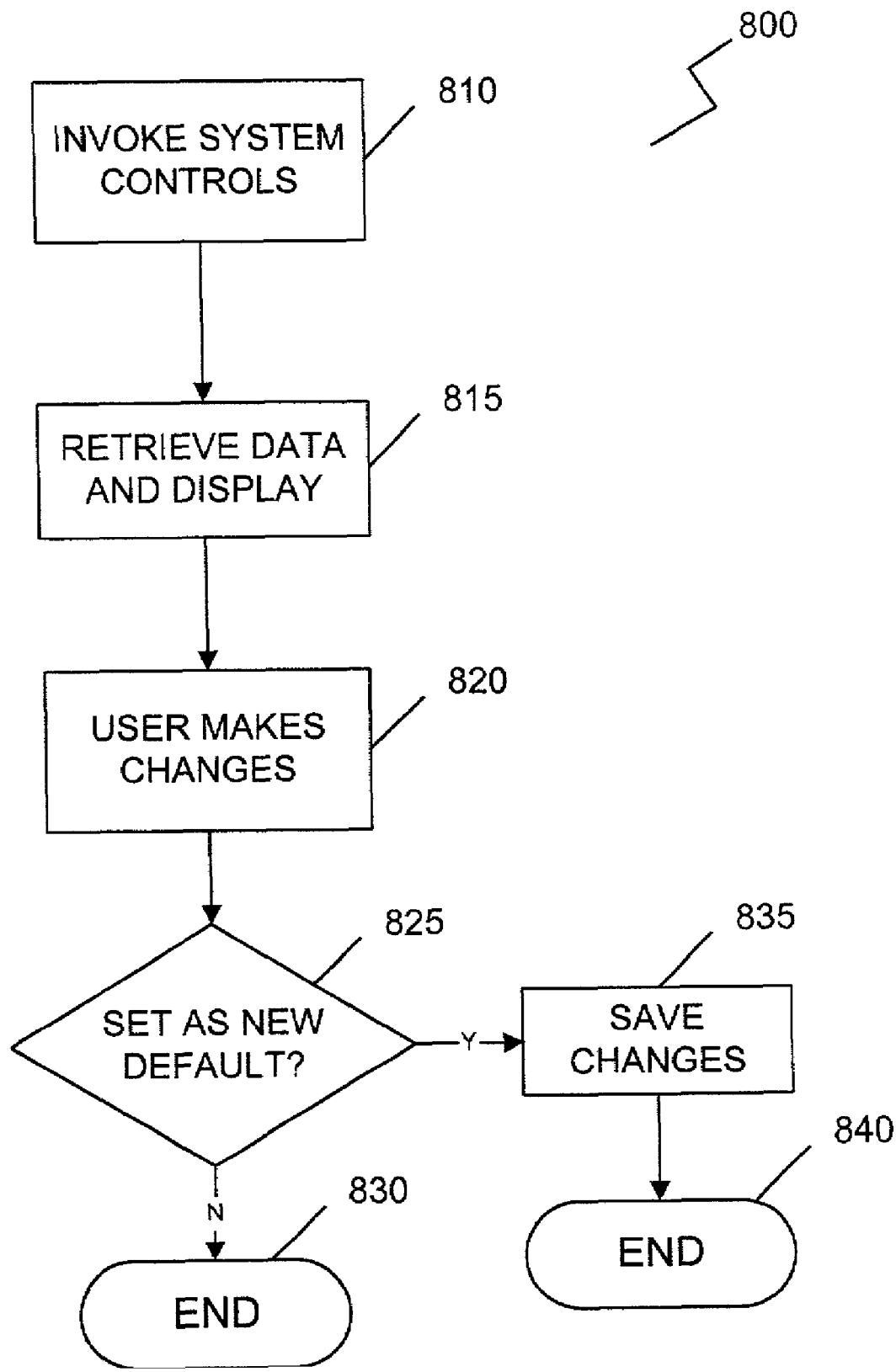
FIG. 8 is a flow chart of a process for changing or overriding the sharing criteria established via the processes of FIGS. 4 and 7.

Referring to FIG. 8, sharing criteria may be modified according to a procedure 800. The process begins when the mobile device user enters into mobile device 140 the correct commands to initiate changing the sharing criteria to any folder, file, application or piece of hardware (e.g., a printer). In one implementation, the user accesses this feature via the "Control Panel" of the Windows® operating systems.

In response, mobile device 140 retrieves the sharing criteria from the database(s) and displays them to the mobile device user (step 815). Again, as an example, mobile device 140 retrieves data from data table 300 in FIG. 3.

The user of mobile device 140 then makes the desired change (e.g., changing a folder from strictly user ID/password access to network identifier access and vice versa) (step 820). After the mobile device 140 user has made all of his/her changes, the user is prompted as to whether these changes are to be the new default settings or if this change is temporary (i.e., the modifications are only valid as long as mobile device 140 is on and not-rebooted) (step 825).

If the mobile device user decides that these changes are not to be new default settings, then the process ends (step 830). If the mobile device user decides to set the changes as default(s), then the database(s) is rewritten with the changes made (step 835). The process then ends (step 840).

A number of implementations have been described. Nevertheless, it will be understood that various modifications may be made. For example, once a file is accessed by the network user, the uses to which he/she may have the file for may be restricted. For example, some files may be read only. Thus, the network user who obtains access through the sharing criteria may only be able to read the file, and may be unable to write to the file. Other files may be locked to prevent them from being printed or copied. The restriction on copying helps in licensed applications in that some individuals may use an application, through the sharing criteria, but cannot copy the application for non-licensed use.

While the above examples referred to use in notebook computers, it should be understood that other devices can implement the above described systems and methods. For example, many personal digital assistants (PDAs) have operating systems that allow them to store folders, files and applications. These PDAs can be coupled to a network and allow sharing of their resources as described above.

Similarly, mobile telephones, pagers and wireless modems also can be implemented with the systems and methods described above. In these systems, the port allows the phone or pager into the network environment when the phone or pager is turned on. Thus, when two phones or pagers are both turned on, the network environment recognizes this and allows them to exchange data such as email messages, short messages generated using Short Messenger Service (SMS), and contact information like names and phone numbers. The user of a mobile phone or pager establishes sharing criteria to prevent some other phone or pager users from obtaining information that they should not.

Shared resources are also not limited to the folder, file, application and printer examples given above. For example, scanners, ROM drives, disk drives and memory also may be shared.

In other implementations, access to the shared resources is accomplished through more than one network. As an example, referring to FIG. 1, mobile device 140 can be coupled to port 102 and still allow for access to the shared resources by computer 128 where computer 128 uses networks 124, 160 and 104 to access the desired resource. This is accomplished by having computer 128 forward a network ID associated with networking environment 120 (e.g., the MAC address of port 122) to mobile device 140 when it is coupled to port 102. The network ID is simply forwarded to mobile device 140 through networks 124, 160 and 104 along with instructions to provide access to a particular resource. Mobile device 140 responds by providing access to the resource, based upon the forwarded network ID, to computer 128. For this type of access, mobile device 140 behaves as though it is coupled to port 122 when it is in fact coupled to port 102.

In yet another implementation, the user is not given a choice with respect to selecting a network portion of the sharing criteria, but is instead defaulted into using the network ID of the network the mobile device 140 is currently coupled to.

It should also be noted that the techniques described above allow easy addition and subtraction of network users by a mobile device user. More specifically, if the sharing criteria are based solely on network identifiers, new users can be added to the network environment and obtain instant access to those resources. Similarly, when users leave a network environment (i.e., resign from employment), they lose access to that network and thus lose access to the shared resources that have the network identifier as part or all of their sharing criteria. The mobile device user does not have to individually provide new employees with access to shared resources on an individual basis but can instead have them added automatically through the use of network ID sharing criteria.

It should also be noted that there does not necessarily need to be a 1-to-1 correlation between networks and network identifiers. As shown in FIG. 1, there are two ports 102 and 116 in network environment 100. The mobile device 140 user is able to use either port 102 or 116 to access network environment 100 and still be able to grant network users access to resources with that sharing criteria. This is shown in FIG. 3 by the network environment "Main Office" having two network identifiers LMOP123, associated with one port, and ZYXW8765, associated with another port. There are other ways to achieve port independence for network access. A second data table can be created that associates a network name with the plurality of network identifiers associated with that network. When mobile device 140 is coupled to a particular port, it will use the port's network identifier to retrieve the network name using this second data table. Subsequent requests for resource access by network users are filtered through the second data table to determine if the network user is associated with the network environment.

Accordingly, these and other implementations are within the scope of the following claims.

What is claimed is:

1. A computer-implemented method comprising:
coupling a mobile device having a first resource to a first network environment;
reading, by the mobile device, a first network identifier associated with the first network environment and a port;
determining, by the mobile device, whether the first network identifier satisfies a first access requirement stored locally at the mobile device;
obtaining a user name and password associated with a particular user of the first network;
reading, by the mobile device, a second access requirement stored locally at the mobile device;
determining, by the mobile device, if the user name and password satisfies the second access requirement before allowing access to the first resource; and
allowing access to the first resource if the first network identifier satisfies the first access requirement and the user name and password satisfies the second access requirement.

2. The method of claim 1 further comprising:
obtaining a user name and password associated with a particular user of the first network after allowing access to the first resource;
reading a second access requirement stored locally at the mobile device and associated with a second resource after allowing access to the first resource;
determining if the user name and password satisfies the second access requirement; and
allowing access to the second resource if the user name and password satisfies the second access requirement.

3. The method of claim 1 further comprising:
reading a user name and password associated with a second network environment;
determining whether the user name and password satisfies a second access requirement stored locally at the mobile device; and
allowing access to a second resource associated with the mobile device if the user name and password satisfies the second access requirement.

4. A computer-implemented method of establishing and using sharing criteria to control access to a resource comprising:
reading, by a mobile device, a first network identifier associated with a first network environment and a port;
receiving, by the mobile device, an indication that a first resource on the mobile device is to be associated with the first network identifier;
storing, at the mobile device, the first network identifier in a first association with a resource identifier that identifies the first resource so that access to the resource is contingent upon receipt of the first network identifier;
receiving by the mobile device a user name and password associated with a particular user;
receiving by the mobile device an indication that the first resource is to be associated also with the user name and password; and
storing, at the mobile device, the user name and password in a second association with the resource identifier so that the access to the first resource is contingent also upon receipt of the user name and password.

5. The method of claim 4 in which the storing of the first network identifier in association with the resource identifier is accomplished by copying a portion of an association between the first network identifier and a second resource.

6. The method of claim 4 further comprising:
receiving a network identifier associated with an entity attempting to access the resource;
comparing the received network identifier with the stored network identifier; and
allowing access to the first resource if the received network identifier matches the stored network identifier.

7. The method of claim 4 further comprising:
receiving a network identifier associated with an entity attempting to access the resource;
comparing the received network identifier with the stored network identifier; and
denying access to the first resource if the received network identifier does not match the stored network identifier.

8. The method of claim 4 further comprising:
removing the first association between the first network identifier and the resource identifier so that access to the first resource is allowed without receipt of the first network identifier.

9. The method of claim 4 further comprising:
suspending temporarily the first association between the first network identifier and the resource identifier so that access to the first resource is allowed without receipt of the first network identifier.

10. The method of claim 4 further comprising:
displaying a second network identifier;
receiving an indication that the first resource is to be associated with the second network identifier;

and storing the second network identifier in a second association with the resource identifier so that access to the first resource is contingent upon receipt of either the first network identifier or the second network identifier.

11. A computer readable medium including instructions for causing a processor to:

read, by a mobile device, a first network identifier associated with a first network environment and a port;

receive, by the mobile device, an indication that a first resource on the mobile device is to be associated with the first network identifier;

store in memory of the mobile device the first network identifier in a first association with a resource identifier that identifies the resource so that access to the first resource is contingent upon receipt of the first network identifier;

receive, by the mobile device, a user name and password associated with a particular user;

receive, by the mobile device, an indication that the first resource is to be associated also with the user name and password; and store in the memory of the mobile device the user name and password in a second association with the resource identifier so that the access of the first resource is contingent also upon receipt of the user name and password.

12. The computer readable medium of claim 11 in which to store in the memory the first network identifier in association with the resource identifier a copy of a portion of an association between the first network identifier and a second resource is used.

13. The computer readable medium of claim 11 wherein the instructions cause the processor to:

receive a third network identifier;

compare the third network identifier with the stored first network identifier; and allow access to the resource if the third network identifier and the stored first network identifier are substantially equal.

14. The computer readable medium of claim 11 wherein the instructions cause the processor to:

remove the first association between the first network identifier and the resource identifier so that access to the first resource is allowed without receipt of the first network identifier.

15. The computer readable medium of claim 11 wherein the instructions cause the processor to:

suspend temporarily the first association between the first network identifier and the resource identifier so that access to the first resource is allowed without receipt of the first network identifier.

16. The computer readable medium of claim 11 wherein the processor is located in a mobile device comprising one of the following: a notebook computer, a mobile telephone and a personal digital assistant.

17. The computer readable medium of claim 11 wherein the resource comprises one of the following: a folder, a directory, a file, an application, a printer, a disk drive, a ROM drive, memory and a scanner.

* * * * *